United States Patent [19]

Leturgez

[11] 4,058,894
[45] Nov. 22, 1977

[54] LEVER-OPERATED SHEARS

[75] Inventor: Georges Joseph Leturgez, Loison sous Lens, France

[73] Assignee: Laminoirs Trefileries Cableries de Lens (Anciens Etablissements Gaillard-Stievenart), Lens, France

[21] Appl. No.: 686,663

[22] Filed: May 14, 1976

[30] Foreign Application Priority Data

May 14, 1975   France ............................... 75.15024

[51] Int. Cl.² .................... B26B 13/16; B26B 13/26
[52] U.S. Cl. .................................... 30/251; 30/231
[58] Field of Search ............... 30/251, 190, 249, 250, 30/231, 233

[56] References Cited

U.S. PATENT DOCUMENTS

| | | | |
|---|---|---|---|
| 2,391,598 | 12/1945 | Serdich | 30/251 X |
| 3,090,121 | 5/1963 | Chonka | 30/251 |
| 3,587,173 | 6/1971 | Hexdall | 30/251 |

*Primary Examiner*—Jimmy C. Peters

*Attorney, Agent, or Firm*—Wenderoth, Lind & Ponack

[57] ABSTRACT

The shears comprises a frame, a first jaw integral with the frame, a second jaw pivotable relative to the first jaw, a lever for operating the shears, a first pivot pin pivotally connecting the lever to the frame, a first structure, a second pivot pin pivotally connecting the first structure to the frame, a second structure, a third pivot pin pivotally connecting the second structure to the lever. The first, second and third pivot pins are parallel. The first structure comprises a member mounted to be slidable on the second structure in a direction in alignment with the third pivot pin. A first elastically yieldable device having a rotary action and capable of exerting a substantially constant force is mounted between the frame and the first structure. A second elastically yieldable device having a rectilinear action and capable of exerting a cumulative force is mounted on the second structure between a fixed part of the second structure and the slidable member of the first structure. The two elastically yieldable means are capable of acting in a direction for biasing the lever to its position of rest.

6 Claims, 4 Drawing Figures

LEVER-OPERATED SHEARS

The present invention relates to lever-operated shears, or bench shears, operated with one hand and serving to section hard materials such as metals for sheet metal or boiler work.

It concerns more particularly shears of the type comprising two jaws each of which carries a blade, one of the jaws being permanently integral with a bench or frame and the other being mounted to pivot with respect to the other jaw and connected to an operating lever or arm pivoted to the frame.

In the course of cutting, the blade of the first jaw thus makes an angle with the other blade so that the work is rendered progressive and the cutting force lower. The blade of the fixed jaw is usually horizontal and the operating lever extends substantially vertically upwardly in its position of rest so as to facilitate, as far as possible, the downward operating movement of this lever. It is preferably disposed, in its position of rest, slightly beyond the vertical on the side of the latter opposed to the side toward which it moves when operating the shears, so as to avoid any accidental dropping of the lever. However, there is also provided a safety device adapted to prevent serious accidents which might occur, such as the severing of a finger, owing to such an accidental dropping of the lever from its upper position of rest. This dropping, for example, may be due to a blow on the lever received from a long member which is shifted in the vicinity of the shears or due to the fact that the user had not sufficiently urged the lever back to its position of rest, beyond the vertical, after a cutting operation.

Shears of this type are known in which the safety device is constituted by a retaining chain or a catch means. In these arrangements, it is necessary either to hook the chain (and risk of an accident cannot be avoided when the user forgets to effect this safety operation) or to disengage the catch means for a new cutting operation. Moreover, the return of the lever to the position of rest must in any case be achieved by hand.

An object of the present invention is to provide a shears including means for retaining the lever in the position of rest and an automtic return means for returning the lever to this position.

According to the invention, there is provided a shears of the aforementioned type comprising two structures a first of which structures is pivoted to the frame and the second structure is pivoted to the lever by pivot pins parallel to the pivot pin of the lever, the first structure having a member mounted to be slidable on the second structure in a direction in alignment with the pivot pin connecting the second structure to the lever, and two elastically yieldable means one of which means has a rotary action and exerts a constant force and is mounted between the frame and the first structure whereas the other elastically yieldable means, which has a rectilinear action and exerts a cumulative force, is mounted on the second structure between a fixed point of the second structure and the sliding member of the first structure, said two elastically yieldable means acting in a direction for moving the lever toward its position of rest.

Thus, the combination of the effects of the two elastically yieldable means permits a movement of the lever, in which movement there must be exerted an increasing force on the whole, but in addition, in the course of the movement, a peak or additional force corresponding, as it were, to a release of the retention of the lever in its position of rest, the force being thereafter essentially intended for the shearing operation. This arrangement corresponds to maximum safety and the assembly cooperates in the automatic return of the lever to the position of rest.

In a particularly advantageous manner, the member or part of the first structure which is mounted to be slidable on the second structure is also mounted to slide on the first structure in a direction aligned with the pivot pin connecting the first structure to the frame. This arrangement facilitates a suitable passage of the mechanism through the considered peak force.

In one embodiment of the invention, the first structure and the first elastically yieldable means consist of a hinge having a torsion spring, one hinge part of the hinge being fixed to the frame whereas the other hinge part carries the sliding member, and the second structure consists of a rod and the second elastically yieldable means consists of a coil spring. This arrangement is particularly simple and reliable. Furthermore, and with the same advantage, and for providing a double sliding action, the sliding member is preferably constituted by a sleeve mounted on the rod and guided in an elongate aperture in the moving part of the hinge.

Further features and advantages of the invention will be apparent from the ensuing description which is given merely by way of example with reference to the accompanying drawings, in which.

Figure 1:
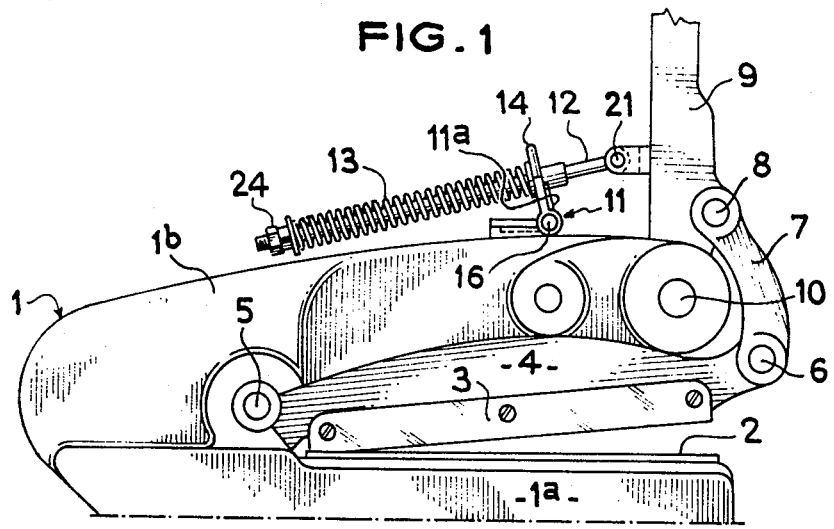
FIGS. 1 and 2 are elevational views of a shears according to the invention, FIG. 1 corresponding to a view of the shears in the course of operation of the operating lever and FIG. 2 to a view of the shears at the end of the operation.

The shears shown in th drawings comprises a bench or frame 1 which is hollowed out in a C-shape having elongated branches so as to permit arranging two blades 2 and 3 in facing relation to each other. The blade 2 is carried by a fixed jaw constituted by the lower part $1^a$ of the frame and the other is carried by a movable jaw 4 which is mounted with respect to the first jaw inthe hollow of the C-shaped frame to be pivotable about a pin 5. This jaw is pivoted at its free end, by a pin 6, to a slightly cranked roughly vertical link 7 which is pivoted by another pin 8 to an operating lever or arm 9. The latter is of great length and disposed above the upper part $1^b$ of the frame and pivoted to the free end of the upper part $1^b$ by a pin 10 parallel to the pin 5, the pivot pin of the link being disposed at a rather small distance from the pivot pin 10 so as to provide a maximum leverage in the transmission of the force from the lever 9 to the jaw 4.

The shears further comprises a device for automatically returning the lever 9 to a position of rest and retaining the lever in this position. This device comprises a hinge 11 having an inner torsion spring $11^a$, a rod 12, a coil spring 13 and a sleeve 14.

Figure 2:
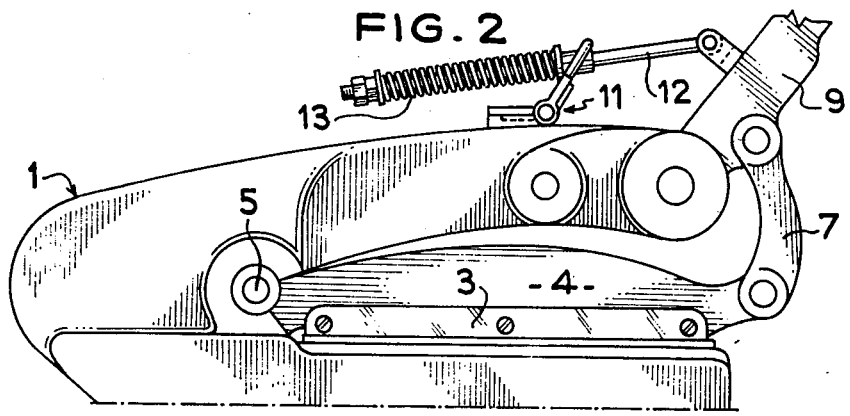
Figure 3:
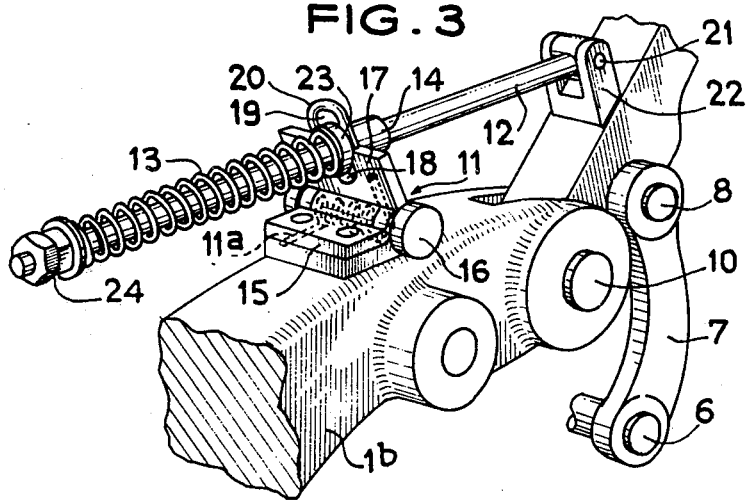
FIG. 3 is a partial perspective view of the automatic return and retaining means for the operating lever.

The hinge part 15 of the hinge is permanently secured to the top of the upper part $1^b$ of the frame at a certain distance to the rear of the pivot pin 10 of the lever, the pivot or hinge pin 16 of the hinge extending in a direction parallel to the pin 10. The other hinge part 17 has a notch 18 which defines an elongate aperture 19 with a U-member 20 fixed to the edge of the hinge part in the extension of the notch. If it is considered that the lever 9 moves from its shearing position (FIG. 3) to its position of rest in pivoting about its pin 10 in a movement toward the left as viewed in FIGS. 1 and 2, the torsion spring of the hinge, which has a rotary action and exerts a constant force, is disposed in the hinge in such manner as to bias the moving hinge part 17 toward the left that is to say in the same direction as the movement of the lever to its position of rest.

The rod 12 is mounted at one end, by a pivot pin 21 parallel to the pin 10, to pivot on a member 22 which is fixed to the lever 9 and is perpendicular to the latter on the side of the lever adjacent the hinge 11 and remote from the pivot pin 8 of the link 7. This rod is disposed in a sleeve 14 whose outside diameter corresponds to the width of the aperture 19 so that the sleeve can extend through the aperture while it is maintained in bearing relation to the assembly comprising the hinge part 17 and the U-member 20 by an end flange 23 which bears behind the U-member or the hinge part 17 on the side thereof opposed to the side on which the rod 12 is pivoted to the lever 9. The rod 12 extends beyond the sleeve 14 and carries at its free end a support 24 constituted, for example, by a washer, a nut and a lock-nut engaged on a screwthreaded end portion of the rod. The coil spring 13 is mounted on the rod between the support 24 and the flange 23 of the sleeve 14.

Figure 4:
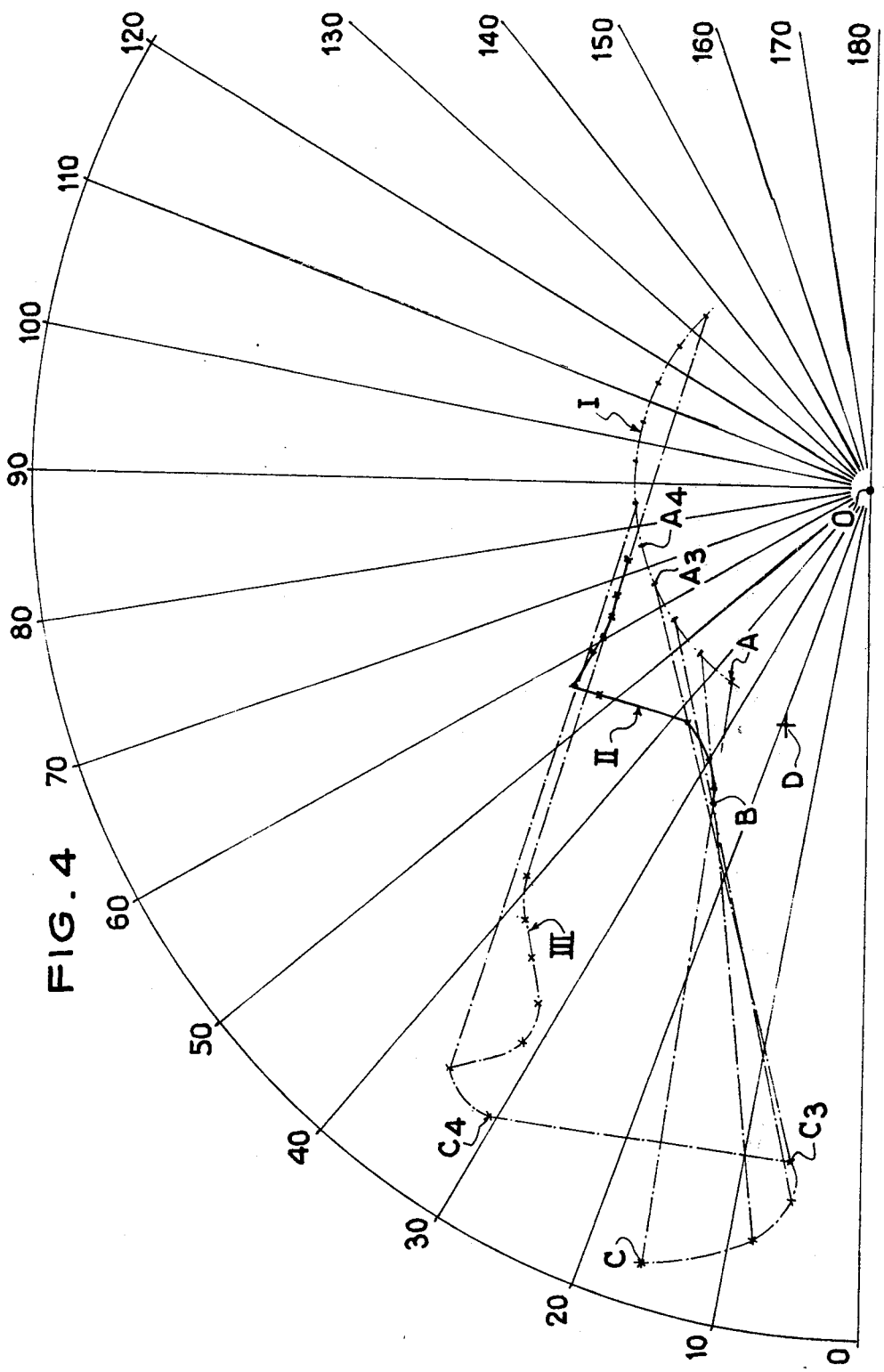
FIG. 4 is a diagram illustrating the relative paths of travel of pivot pins of the shears during operation.

The diagram shown in FIG. 4 represents, in a plane perpendicular to the three pivot pins 10, 16 and 21, the paths travelled through respectively by a point A representing the pin 21 (path I), a point B at which the flange 23 bears against the assembly comprising the U-member 20 and the hinge part 17 (path II), and a point C representing the support 24 of the rod 12 (path III), in a system of polar co-ordinates having for origin a fixed point O representing the pivot pin 10 of the lever 9 and angles plotted 10° apart from 0° to 180° above the horizontal of the point O, the fixed point D representing the pivot pin 16 of the hinge 11.

During the operation of the lever or arm 9 between its extreme positin of rest and its extreme shearing position, the point A describes an arc of a circle the ends of which correspond to angular positions of 35° and 135° respectively. The points A, B and C — which are always in alignment with each other since they are carried by the rectilinear rod 12 — are represented in their successive positions corresponding to successive angular displacements through 10° of the point A and they carry the indices 1 to 10 in these various positions. It will be observed that the point D is located roughly at the same distance from the point O as the point A and at an angle of about 20° to the horizontal.

In the position of rest, the point B is located approximately on the bisector of the angle AOD, but roughly nearer by one half to the points A and D than the point O. The rod 12 (ABC) is then roughly horizontal with its end C slightly higher. As the point A is displaced through the first 30°, the rod gradually and slowly tilts with its end C moving downwardly. During the whole of this movement the sleeve 14 remains at the bottom of the notch 18 of the hinge part 17.

When the point A thereafter travels through the following 10°, (from $A_3$ to $A_4$), the rod tilts rapidly and suddenly in the opposite direction with its end C moving upwardly (from $C_3$ to $C_4$). This change corresponds to the instant when the hinge part 17 of the hinge (or the line OA) has become roughly perpendicular to the line 12 (or the line ABC). This change is accompanied by a sudden and rapid sliding of the sleeve 23 in the aperture 19 until the sleeve bears against the end of the U-member 20.

As the point A thereafter travels through the last 60°, the rod once again gradually and slowly tilts about a mean position which is sightly inclined to the horizontal with its end C located above and moving in succession upwardly, downwardly and again upwardly. During all this movement, the sleeve 14 remains at the outer end of the U-member 20.

Moreover, throughout the movement, the sleeve slides on the rod and moves practically all the time from the right to the left, that is to say from the pivot pin 21 toward the support 24, which corresponds to a progressive shortening of the spring 13 which is interrupted by a maintenance of a roughly constant length, as shown in the following table which gives the length of the spring for each one of the eleven successive positions numbered 0 to 10 between the position of rest 0 and the position 10 corresponding to the end of shearing. This table also shows, for the same positions, the force to be applied to the lever for shifting the latter and the angle of rotation of the moving hinge part 17 of the hinge which corresponds to the angle of the straight line OA with respect to the horizontal.

TABLE

| Position | 0 | 1 | 2 | 3 | 4 | 5 | 6 | 7 | 8 | 9 | 10 |
|---|---|---|---|---|---|---|---|---|---|---|---|
| Length of spring 13 (mm) | 175 | 170 | 170 | 170 | 165 | 150 | 153 | 142 | 130 | 126 | 125 |
| Force (kg) | 0 | 5 | 5 | 5 | 20 | 50 | 44 | 66 | 90 | 98 | 100 |
| Angle of the hinge (°) | 50 | 57 | 70 | 90 | 110 | 115 | 120 | 130 | 132 | 134 | 138 |

This table shows that the force to be applied on the lever 9 does not vary in a perfectly regular manner but has an intermediate maximum or pseudo-step which corresponds to the aforementioned sudden change and results from the combined effect of the spring of the hinge 11 and the coil spring 13. The peak force to be exerted for this change corresponds to the release of the retention of the lever in the vicinity of the position of rest.

The diagram and the table moreover show that this device associates the application of a lower operating force on the lever 9 with a safety function by an automatic return and retention of the lever.

Having now described my invention what I claim as new and desire to secure by Letters Patent is:

1. A lever-operated shears comprising a frame, a first jaw integral with the frame and carrying a first cutting blade, a second jaw pivotable relative to the first jaw and carrying a second cutting blade, an operating lever pivotally connected to the frame by a first pivot pin, a link for pivotally connecting said lever to said second jaw, said link being located beyond said first pivot pin with respect to said connection of said second jaw on said first jaw, said lever having a rest position, said shears further comprising a device for authomatically returning said lever to and maintaining it in said rest position, said device comprising a first member pivotally connected to said frame by means of a second pivot pin, a second member pivotally connected to said lever by means of a third pivot pin and slidably mounted through said first member on one hand and in the plane thereof, in a direction perpendicular to said second pivot pin on the other hand, said first, second and third pivot pins being parallel one to another, a first elastically yieldable means having a rotary action, and mounted between the frame and said first member, and a second elastically yieldable means having a rectilinear action and mounted on said second member between one end thereof and said first member, said first and second elastically yieldable means being capable of acting in a direction for biasing the lever to its rest position.

2. A shears as claimed in claim 1, wherein said first member comprises a part slidably mounted in said second direction in said first member, said second member being slidably mounted through said first member in said first direction by means of said slidable part.

3. A shears as claimed in claim 1, wherein said first member and said first elastically yieldable means comprise a hinge combined with a torsion spring a first hinge part of the hinge being fixed to the frame and at second hinge part of the hinge carrying said slidable part, said second member comprising a rod and said second elastically yieldable means comprising a coil spring mounted on said rod, between the end thereof opposite to said third pivot pin and said sliding part of said first member.

4. A shears as claimed in claim 2, wherein the first member and the first elastically yieldable means comprise a hinge combined with a torsion spring, a first hinge part of the hinge being fixed to the frame and a second hinge part of the hinge carrying said slidable part, said second member comprising a rod and the second elastically yieldable means comprising a coil spring, the sliding part comprising a sleeve mounted on the rod and the second hinge part of the hinge defining an elongated aperture, extinding perpendicularly to said second pivot pin and guidingly engaging the sleeve.

5. A shears as claimed in claim 4, wherein the sleeve has a flange which bears against the second hinge part of the hinge on a side of the second hinge part adjacent the coil spring, which coil spring bears against said flange.

6. A shears as claimed in claim 4, wherein the aperture is defined partly by a notch in the second hinge part of the hinge and partly by a U-member fixed to the second hinge part in the extension of the notch.

* * * * *